A. L. DAY.
MEANS FOR MAINTAINING A CONSTANT WORKING LEVEL IN GLASS FURNACES.
APPLICATION FILED FEB. 6, 1912.
1,074,167.
Patented Sept. 30, 1913.
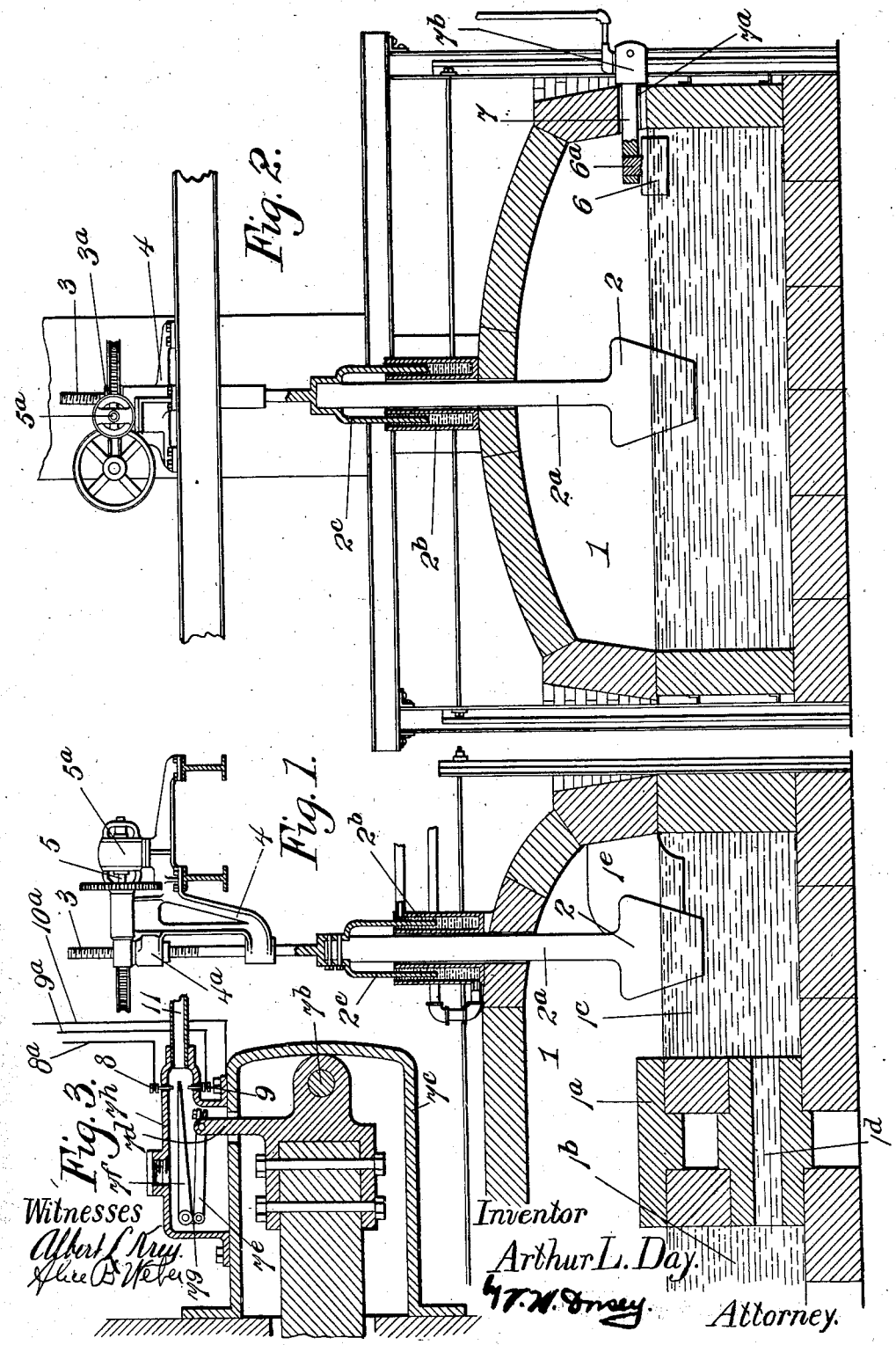
Witnesses
Albert L. Day.
Alice D. Weber.
Inventor
Arthur L. Day.
J. W. Imay.
Attorney.

UNITED STATES PATENT OFFICE.

ARTHUR L. DAY, OF WASHINGTON, DISTRICT OF COLUMBIA, ASSIGNOR TO EMPIRE MACHINE COMPANY, OF PORTLAND, MAINE, A CORPORATION OF MAINE.

MEANS FOR MAINTAINING A CONSTANT WORKING LEVEL IN GLASS-FURNACES.

1,074,167.  Specification of Letters Patent.  Patented Sept. 30, 1913.

Application filed February 6, 1912. Serial No. 675,897.

*To all whom it may concern:*

Be it known that I, ARTHUR L. DAY, a citizen of the United States of America, and a resident of Washington, District of Columbia, have invented certain new and useful Improvements in Means for Maintaining Constant Working Levels in Glass-Furnaces, of which the following is a specification.

My invention has for its object to provide means whereby the level of the molten glass in the pool from which it is taken for use in any of the various processes of its manufacture may be maintained constant. This constancy of level is of especial value in those processes in which the glass is gathered on the end of an iron which is dipped into the pool and withdrawn with a body of glass thereon, in that the amount of glass so gathered depends, among other things, upon the extent the iron is immersed, and because in the manufacture of many articles the quantity of glass which is so gathered upon the end of the iron must be uniform.

For the purposes stated my invention contemplates a gathering pool separate from and independent of a main melting pool, and communicating therewith by a passage of restricted cross sectional area with means for varying the cross sectional area of the gathering pool at such a rate that the level of glass therein will be maintained constant in spite of the removal therefrom of the successive gathers. This variation in the cross section of the pool is accomplished automatically by any departure of the glass level from normal.

The main melting pool has a relatively large capacity as compared with that of the gathering pool and is replenished from time to time by fresh material as the consumption of glass from the gathering pool or pools connected therewith causes the level of the glass therein to lower.

To prevent the variations which would occur in the gathering pool under these conditions is the object of this invention, and it accomplishes this by reason of the fact that the area of the restricted passage is such that upon a variation of level in the gathering pool due to the variation of the cross sectional area thereof it retards the transfer of molten glass from the pool of higher level to the pool of lower level.

For these purposes my invention contemplates a furnace provided with a gathering pool and a melting pool and a communicating passage of restricted area between them, of a displacement block within the gathering pool and means dependent upon a predetermined departure of the glass in the latter from a normal level to vary the elevation or depression of the block and thus effect a corresponding variation in the capacity of the gathering pool, whereby the glass in the latter will be restored to its normal level and it further consists of the construction, arrangement and combination of parts by which it is thus rendered possible.

Referring to the accompanying drawings in which corresponding parts are designated by corresponding marks of reference, Figure 1 is a vertical fragmental section through a furnace having my invention applied thereto. Fig. 2 is a similar view taken at right angles to Fig. 1. Fig. 3 is a detail sectional view showing the mounting of the float and the contacts controlled thereby.

The furnace 1 is of usual construction, save that it has therein a transverse wall 1ª dividing its interior into a melting pool or chamber 1ᵇ of comparatively great capacity and a gathering pool or chamber 1ᶜ, the two being in communication with each other through the restricted passage 1ᵈ formed in the wall 1ª. The gathering chamber is also shown as provided with boots 1ᵉ through which a gathering iron may be inserted.

A displacement block 2 is contained within the gathering chamber, and has a stem 2ª projecting upwardly through the roof of the furnace, the opening formed therein for this purpose being protected and closed by the water seal formed by a casing 2ᵇ mounted on the furnace top and a bell 2ᶜ carried on the stem. The upper end of the stem terminates in a threaded extension 3, having thereon a nut 3ª which rests upon the bearing 4ª, of a bracket 4 suitably supported above the furnace. A worm upon the shaft 5, of an electric motor 5ª mounted on the bracket, gears with the periphery of the nut so that the displacement block will be raised or lowered in the gathering chamber by the rotation of the motor, depending upon the direction in which the latter is driven. Within the gathering chamber is also contained a float 6 of refractory material, having a stud 6ª upon its upper face, which stud enters a suitable recess in the inner end of a lever 7, which extends through an opening 7ª in the wall of the furnace and is pivoted at 7ᵇ upon the exterior thereof and within a casing 7ᶜ surrounding and closing the said opening. An arm 7ᵈ extends upwardly from near the outer end of the lever and has its upper end connected by means of the adjustable link 7ᵉ with one arm of a bell crank lever 7ᶠ pivoted at 7ᵍ within a dome 7ʰ, upon the top of the casing 7ᶜ, the opposite arm of the lever being located between two contact points 8 and 9, which are respectively connected to two wires 8ª and 9ª. A third wire 10ª is connected to the dome 7ʰ. The wires 8ª, 9ª and 10ª form parts of two circuits, the wire 10ª being a part of both, which circuits may either be led through the motor 5ª to form energizing circuits therefor or be in the form of controlling circuits for the energizing circuit of the motor.

In order to protect the mounting of the levers, etc., from the excessive heat, I may as shown in Fig. 3, provide a pipe 11 for introducing a current of air into the dome 7ʰ, which flows through the dome and casing and into the furnace through opening 7ª.

The operation of the device is as follows: Upon the level of the glass in the pool being lowered, the float will lower and cause contact to be made between the lever 7ᶠ and the contact 9, closing the circuit through the wires 9ª and 10ª and driving the motor to lower the displacement block, which, by reducing the cross sectional area of the gathering pool, raises the level of the glass therein. When this level has increased sufficiently it will, by lifting the float, break the circuit between the wires 9ª and 10ª, and arrest the motor. The difference of level thus created in the gathering pool over that in the melting pool is due to the fact that the passage 1ᵈ has its area so restricted to retard the transfer of the molten glass from one pool to the other. When, by further use of the glass from the gathering pool and the slow flow of glass therefrom to the melting pool, the level of glass in the former is again reduced below the predetermined limit fixed by the adjustment of the level controller, the operation above described will be repeated and this will occur from time to time until the limit of lowering of the displacement block has been reached or until a fresh batch of glass is fed into the melting tank. As the level of glass rises in the latter, the molten glass will flow into the gathering pool and will raise the level of glass therein, closing the circuit between the wires 8ª and 10ª and causing the motor to lift the displacement block, thus increasing the sectional area of the gathering pool and reducing the glass level thereof, the action being the reverse of that before described, and will be repeated from time to time. It will also be seen that the apparatus here described provides means for retaining the level of the gathering pool constant, in spite of variations which would otherwise occur due to temporary excess of the rate at which the glass is gathered over the rate at which it flows into the gathering pool.

Having thus described my invention what I claim is:—

1. In a glass furnace, the combination with a furnace having separate melting and gathering pools communicating with each other by a restricted passage, of means actuated by a temporary variation of glass level in the gathering pool to vary the glass capacity of the gathering pool at a rate in excess of the discharge capacity of the restricted passage, whereby the glass in the gathering pool will be restored to normal level.

2. In a glass furnace, the combination with a furnace having separate melting and gathering pools communicating with each other by a restricted passage, of a displacement block, and means actuated by a temporary variation of level in the gathering pool to raise or lower the block in the glass therein, to effect a variation in the capacity of the gathering pool at a rate greater than the discharge capacity of the restricted passage whereby the glass in the gathering pool will be restored to normal level.

In testimony whereof I have signed my name in presence of two witnesses.

ARTHUR L. DAY.

In presence of—
 ALBERT L. KREY,
 GEO. M. BOND.